United States Patent
Ai et al.

(10) Patent No.: US 11,394,675 B2
(45) Date of Patent: Jul. 19, 2022

(54) METHOD AND DEVICE FOR COMMENTING ON MULTIMEDIA RESOURCE

(71) Applicant: BEIJING DAJIA INTERNET INFORMATION TECHNOLOGY CO., LTD., Beijing (CN)

(72) Inventors: Shuming Ai, Beijing (CN); Fujia Liu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/123,507

(22) Filed: Dec. 16, 2020

(65) Prior Publication Data

US 2021/0218696 A1 Jul. 15, 2021

(30) Foreign Application Priority Data

Jan. 15, 2020 (CN) .......................... 202010044367.9

(51) Int. Cl.
*G06F 15/16* (2006.01)
*H04L 51/10* (2022.01)
*G06F 16/51* (2019.01)
*H04L 51/046* (2022.01)

(52) U.S. Cl.
CPC .............. *H04L 51/10* (2013.01); *G06F 16/51* (2019.01); *H04L 51/046* (2013.01)

(58) Field of Classification Search
None
See application file for complete search history.

(56) References Cited

U.S. PATENT DOCUMENTS

| | | |
|---|---|---|
| 2014/0279418 A1 | 9/2014 | Rubinstein et al. |
| 2016/0306438 A1* | 10/2016 | Kehoe ................... G06F 3/0482 |
| 2016/0359771 A1* | 12/2016 | Sridhar ................... H04L 51/02 |
| 2017/0185581 A1 | 6/2017 | Bojja et al. |
| 2019/0251152 A1 | 8/2019 | Leydon et al. |
| 2020/0073485 A1* | 3/2020 | Al-Halah ............... G06N 20/00 |
| 2020/0374243 A1* | 11/2020 | Jina ......................... H04L 51/02 |
| 2020/0387534 A1* | 12/2020 | Rendahl ................ G06F 16/483 |
| 2021/0076102 A1* | 3/2021 | Patel ................... H04N 21/4828 |

FOREIGN PATENT DOCUMENTS

WO    2018128214 A1    7/2018

OTHER PUBLICATIONS

Search Report for EP application 21151561.4.

* cited by examiner

*Primary Examiner* — Brian Whipple
*Assistant Examiner* — Gregory P Tolchinsky
(74) *Attorney, Agent, or Firm* — Timothy W. Menasco, Esq.; Harter Secrest & Emery LLP

(57) ABSTRACT

The disclosure provides a method for commenting on a multimedia resource, a related electronic device and a storage medium. In response to a comment trigger operation on a multimedia resource, the electronic device obtains an emoticons corresponding to the multimedia resource and displays the emoticons to enable a user account to comment on the multimedia resource.

10 Claims, 5 Drawing Sheets

METHOD AND DEVICE FOR COMMENTING ON MULTIMEDIA RESOURCE

CROSS REFERENCE TO RELATED APPLICATIONS

This application is based on and claims priority to Chinese Patent Application No. 202010044367.9, filed on Jan. 15, 2020, in the China National Intellectual Property Administration, the disclosure of which is herein incorporated by reference in their entireties.

FIELD

The disclosure relates to a field of communication technologies, and more particularly to a method and a device for commenting on a multimedia resource, an electronic device, and a storage medium.

BACKGROUND

In a social interaction of Internet, emoticons, as a direct and active social form between social objects, have become an information transmission carrier same as text, pictures, voice, and video.

SUMMARY

Embodiments of the disclosure provide a method for commenting on a multimedia resource. The method includes: receiving a comment trigger operation on a multimedia resource from a user account; obtaining an emoticons corresponding to the multimedia resource based on the comment trigger operation; and displaying the emoticons to enable the user account to comment on the multimedia resource with the emoticons.

Embodiments of the disclosure further provide an electronic device. The electronic device includes a processor and a memory configured to store computer instructions executable by the processor. In response to determining that the computer instructions are executed by the processor, the above-described method for commenting on a multimedia resource is implemented.

Embodiments of the disclosure further provide a non-transitory computer readable storage medium, having computer instructions stored thereon. When the computer programs are executed by the processor, the above-described method for commenting on a multimedia resource is executed.

It should be understood that, the above general description and the following detailed description are only exemplary and explanatory, and do not limit the disclosure.

BRIEF DESCRIPTION OF THE DRAWINGS

Advantages and benefits will become apparent to an ordinary skilled person in the art by reading detailed description of embodiments below. The drawings are only used for the purpose of illustrating the embodiments, and are not considered as a limitation to the disclosure. Throughout the drawings, the same reference numerals are used to denote the same elements.

DETAILED DESCRIPTION

Exemplary embodiments will be described in detail below. Although exemplary embodiments of the disclosure are illustrated in the accompanying drawings, it should be understood that, the disclosure may be implemented in various manners, which is not limited by embodiments of the disclosure. Instead, the embodiments are provided herein for a thorough understanding of the disclosure and to fully convey the scope of the disclosure to those skilled in the art.

In related arts, when viewing a multimedia resource, a user can comment on a multimedia resource by inputting text or simple emoji on a comment interface of the multimedia resource.

However, in existing methods, commenting the multimedia resource with text or emoji causes the comments monotonous and results in low interaction between users and multimedia resources.

Figure 1:
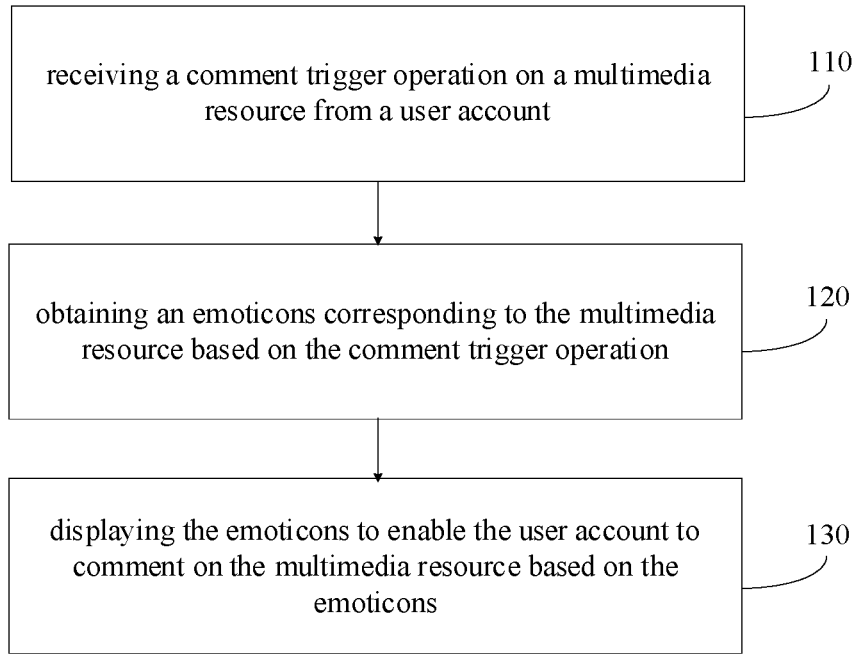
FIG. 1 is a flowchart illustrating a method for commenting on a multimedia resource according to embodiments of the disclosure.

Therefore, embodiments of the disclosure provide a method for commenting on a multimedia resource. As illustrated in FIG. 1, the method may include the following.

At block 110, a comment trigger operation on a multimedia resource is received from a user account.

At block 120, an emoticons corresponding to the multimedia resource is obtained based on the comment trigger operation.

At block 130, the emoticons is displayed to enable the user account to comment on the multimedia resource based on the emoticons.

Figure 2:
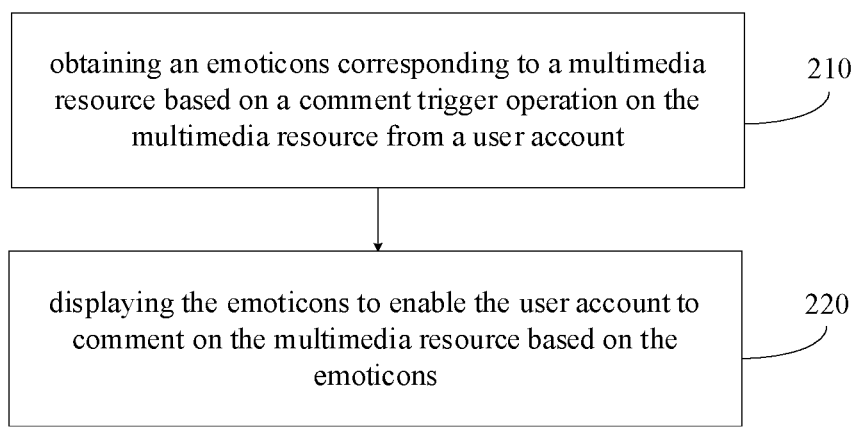
FIG. 2 is a flowchart illustrating a method for commenting on a multimedia resource according to embodiments of the disclosure.

FIG. 2 is a flowchart illustrating a method for commenting on a multimedia resource according to embodiments of the disclosure. As illustrated in FIG. 2, the method may include the following.

At block 210, based on a comment trigger operation on a multimedia resource from a user account, an emoticons corresponding to the multimedia resource is obtained.

In some embodiments of the disclosure, the multimedia resource may be a video file displayed on a playback interface of a browser. The multimedia resource may be provided by a remote service server or stored locally. In addition, the multimedia resource may be in other formats, such as an audio or an image file.

In some embodiments, the emoticons refers to a group, a set or a collection of one or more emoticons or emojis.

For example, the user account may be an account that the user currently logs in. The user may comment on the multimedia resource through the user account.

Figure 3:
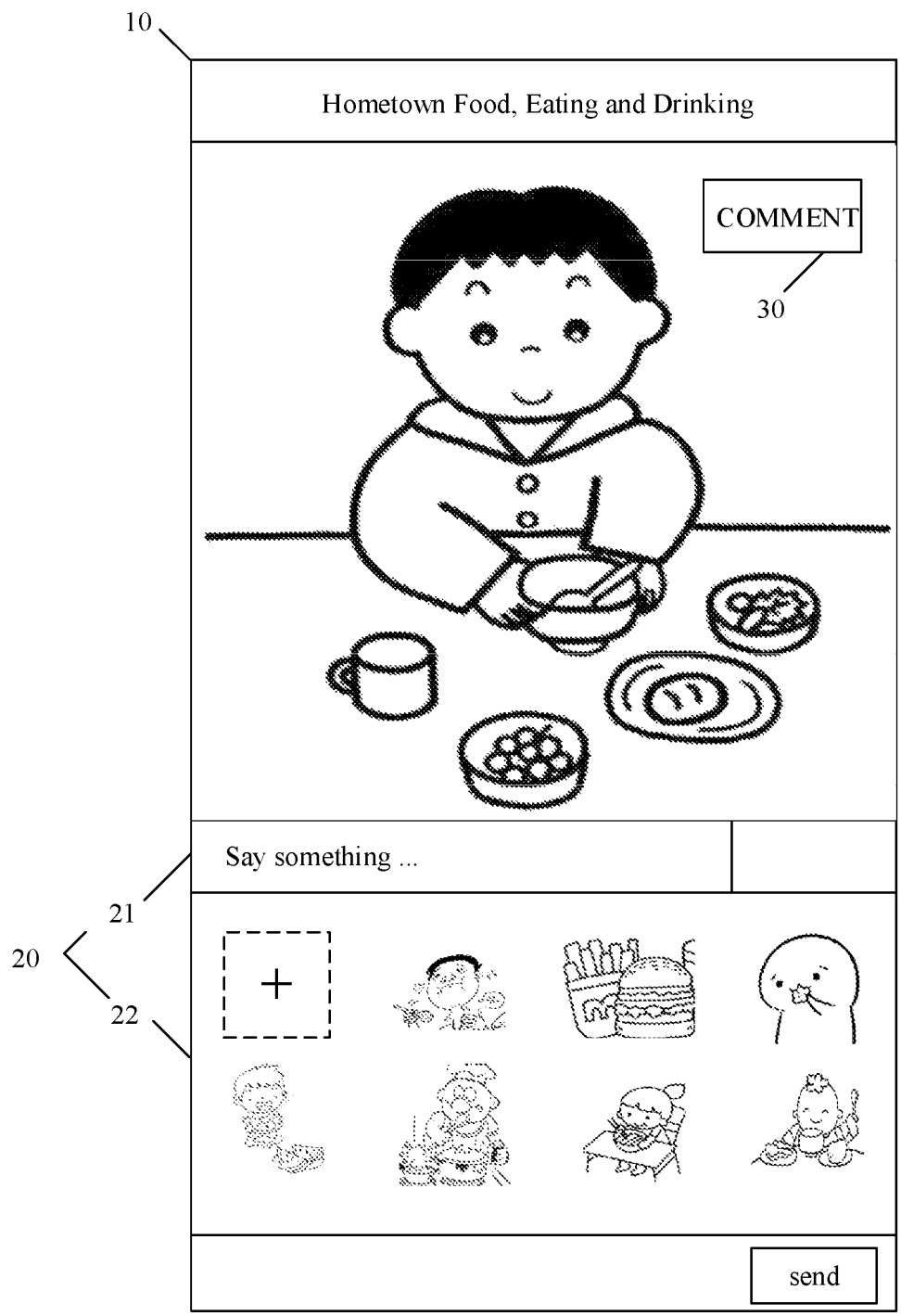
FIG. 3 is a schematic diagram illustrating an interface for commenting on a multimedia resource according to embodiments of the disclosure.

For example, as illustrated in FIG. 3, an interface for commenting on a multimedia resource according to embodiments of the disclosure is provided. For a video having a title of "Hometown Food, Eating and Drinking", on the playback interface 10 for playing the video, the user can click the key of "COMMENT" displayed on the playback interface 10 to trigger an operation for commenting on the multimedia resource. Therefore, the user can input comment content to a comment area 20 generated after triggering the operation for commenting on the multimedia resource, to comment on the video.

For this block, in response to the comment trigger operation on the multimedia resource through the user account, the emoticons corresponding to the multimedia resource can be obtained. Based on the emoticons, the user account may comment on the multimedia resource, thereby improving pertinence of commenting on the multimedia resource.

For example, the emoticons corresponding to the multimedia resource may be an emoticons associated with the multimedia resource or an emoticons having a pre-established correspondence with the multimedia resource.

In addition, the emoticons may be pre-stored in the terminal device. In some examples, the terminal device may send a request for acquiring the emoticons to a service server and acquires the emoticons from a response to the request for acquiring the emoticons from the service server.

For example, a video and an emoticons may be categorized in advance by a video website. A video associated with travel and entertainment may be categorized into a "travel" video, and an emoticons associated with scenery and traveling may be categorized into a "travel" emoticons. In response to the comment trigger operation from the user account, the "travel" emoticons may be determined as the emoticons corresponding to the "travel" video.

At block 220, the emoticons is provided for the user account to comment on the multimedia resource based on the emoticons.

For this block, in a case that the emoticons corresponding to the multimedia resource is obtained, the emoticons may be provided to the user, such that the user may comment on the multimedia resource based on the emoticons. In this case, interesting multimedia resources may be provided while enriching diversity of comments on the multimedia resource by determining the emoticons matching the content of the multimedia resource.

For example, as illustrated in FIG. 3, on the playback interface 10 for playing the video, in response to the comment trigger operation from the user account, the user can comment on the video using a comment area 20 of the playback interface 10. For example, the user can enter text comments into a text input box 21 or comment on the video using the emoticons displayed in an emoticons display area 22 of the playback interface 10. An emoticons collection corresponding to the category of the video is displayed in the emoticons display area 202. The user can select an emoticons from the emoticons collection displayed in the emoticons display area 22 to comment on the video.

In some embodiments, the emoticons collection includes multiple groups of emoticons.

With the method for commenting on a multimedia resource according to embodiments of the disclosure, based on the comment trigger operation on the multimedia resource from the user account, the emoticons corresponding to the multimedia resource is obtained. The emoticons is displayed to the user account, such that the user account comments on the multimedia resource based on the emoticons. In the disclosure, in response to the comment trigger operation on the multimedia resource performed by the user account, based on the emoticons corresponding to the multimedia resource, the user account may comment on the multimedia resource without trivial operations, such as searching or querying, such that the emoticons suitable for commenting on the multimedia resources can be quickly provided to enhance user's experience of commenting.

Figure 4:
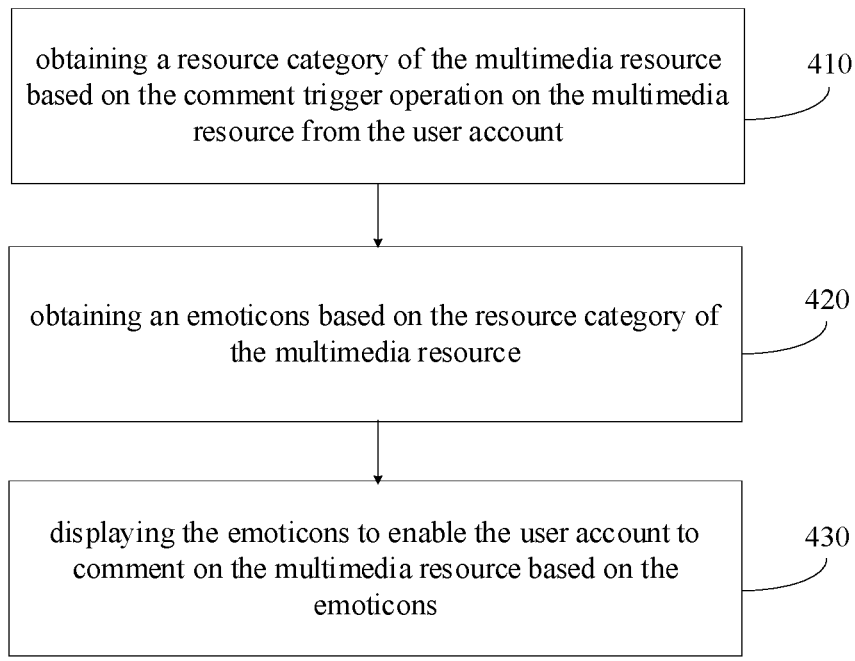
FIG. 4 is a flowchart illustrating another method for commenting on a multimedia resource according to embodiments of the disclosure.

FIG. 4 is a flowchart illustrating another method for commenting on a multimedia resource according to embodiments of the disclosure. As illustrated in FIG. 4, the method may include the following.

At block 410, a resource category of the multimedia resource is obtained based on the comment trigger operation on the multimedia resource from the user account.

In some embodiments of the disclosure, the resource category of the multimedia resource may indicate a classification of the multimedia resource. For example, in a case that the content of the video is eating and drinking, the resource category may be determined as "eating". In a case that the content of the video is traveling and playing, the resource category may be determined as "travel".

In detail, the descriptive text or the title of the multimedia resource can be analyzed to determine the resource category of the multimedia resource. In some examples, the content of consecutive frames of the multimedia resource can be analyzed to determine the resource category of the multimedia resource.

In some implementations of embodiments of the disclosure, the block 410 may further include the following.

At block 4110, image frames included in the multimedia resource are recognized to determine objects of the multimedia resource and relationships of the objects.

In some embodiments of the disclosure, a deep learning model can be used to recognize the image frames included in the multimedia resource, to determine the objects presented by the multimedia resource and the relationships of the objects. The deep learning model is based on a deep learning algorithm and can be used to apply image recognition technology and feature classification technology to the image frames. In some embodiments of the disclosure, a convolutional neural network in the deep learning algorithm may be used to analyze and classify the image frames of the multimedia resource and to output the objects presented by the multimedia resources and the relationships of the objects in real time.

Accuracy of parameters of the deep learning model can be improved by continuously training the model in practical applications, such that the model has a strong adaptability and a strong ability of automatically updating and iterating, thereby improving the processing efficiency.

At block 4120, the resource category of the multimedia resource is determined based on object attributes of the objects, the relationships of the objects, and a resource attribute of the multimedia resource.

The object attribute at least includes an object type or an object name. For example, the object attribute includes only the object type, only the object name or both the object type and the object name. The resource attribute at least includes a resource title or a resource description of the multimedia resource. For example, the resource attribute includes only the resource title, only the resource description, or both the resource title and the resource description.

In detail, essentially, the multimedia resource is obtained by gathering multiple consecutive image frames. Each image frame can be regarded as an image file. Based on the feature extraction algorithm of neural network, an image feature corresponding to each image frame may be obtained. The term "feature" refers to a corresponding characteristic or property of a certain type of object that are used to distinguish from other types of objects, or a collection of these characteristics and properties. The feature can be extracted through measurement or processing. The feature extraction is a dimension reduction process, which is to project a raw image sample into a low-dimensional feature space to obtain a low-dimensional feature of the image sample that best reflects the essence of the image sample or distinguishes the image samples.

By analyzing the image features corresponding to the image frames, the objects included in each image frame and the object attributes of the objects can be recognized.

In practice, the image feature can be processed through a region proposal network (RPN) to generate one or more category regions contained in the image feature of each image frame. The category region where an object of the image feature is located may be accurately determined through a trained region proposal network, thereby improving the efficiency of video classification.

In some embodiments of the disclosure, the convolutional neural network model and existing classifiers can well classify the image features. For example, the image feature of a human image may have the category region where the object (i.e. the human) is located. The category region is input into the classifier to obtain that the object attribute of the object is human. Therefore, through the classifier, the category region where an object of the image feature is located may be classified to determine the object attribute corresponding to the category region. The object attribute can include, but is not limited to: human, food, scenery, cloth, animal and the like. One or more objects may be included in each image feature.

For example, for a frame of the video in which a person is eating with a bowl, the image feature of the frame is processed by the region proposal network to obtain regions where the person, the bowl, and the food are located. The regions are input into the classifier separately to respectively obtain that the object attribute is human, bowl, and food.

In some embodiments of the disclosure, action analysis may be performed on the relationships of the objects of consecutive image frames to obtain a complete behavior attribute of the continuous image frames. The resource category of the multimedia resource can be determined based on the complete behavior attribute. This analysis method based on behavior analysis can be used to automatically and accurately determine the categories of multimedia resources through the deep learning without supervision.

In detail, a recurrent neural network (RNN) can be used to perform behavior analysis on the relationships of the objects of consecutive image frames to obtain the behavior attribute of the multimedia resource. A long short-term memory network (LSTM) can be used to analyze the time series kinematic behavior relationship between image features of consecutive image frames to obtain the behavior attribute of the multimedia resource.

For example, a complete jumping action may be divided into four sub-actions: bending knees, taking off, falling, and landing. Each sub-action can be implemented as a fixed action posture. In a case, a video includes four frames. The category of each frame is determined. The image features of the four frames are sorted based on the time sequence of the video. The object attribute of the object of the image feature of a first frame is human, and the action posture of the object is bending knees. The object attribute of the object of the image feature of a second frame is human, the action posture of the object is taking off. The object attribute of the object of the image feature of a third frame is human, and the action posture of the object is the falling. The object attribute of the object of the image feature of a fourth frame is human, and the action posture of the object is landing. Since the video contains the behavior attribute of a complete jumping action, the category of the video may be determined as a category related to an action that a human is jumping, such as sports and dances, based on the object attributes of the objects, the behavior attribute obtained from the relationships of the objects, and the resource title or resource description of the multimedia resource.

For example, consecutive video frames can be extracted from the multimedia resource that a human is eating delicious food. Through the deep learning algorithm, it may be determined that objects, such as the human, the bowl, and the food, are presented in all of the consecutive video frames. By recognizing changes in action features of the objects in the consecutive video frames, lips opening and closing of the human can be obtained, and in conjunction with the food and the bowl, the resource category of the multimedia resource can be determined as eating and delicious food.

As another example, consecutive video frames can be extracted from the multimedia resource related to traveling. Through the deep learning algorithm, it may be determined that objects, such as human, scenery, and transports are presented in all of the consecutive video frames. By recognizing changes in action features of the objects in the consecutive video frames, the changes of movement of the human and the transports and the changes of the scenery can be obtained. Therefore, the resource category of the multimedia resource can be determined as travel.

As still another example, for a live broadcast of human, the objects identified include the human, clothing and props (such as microphone, guitar, or piano). The facial image of the human may be further identified and compared with images in a sample image collection relates to movie and music stars. Based on determining that the object attribute of the human is the movie or music star, in combination with clothing and props, the resource category of the multimedia resource may be determined as performance.

In some implementations of embodiments of the disclosure, the block 410 may include the following.

At block 4130, a resource attribute of the multimedia resource is extracted. The resource attribute at least includes a resource title or a resource description of the multimedia resource. For example, the resource attribute includes only the resource title, only the resource description, or both the resource title and the resource description.

In some implementations of embodiments of the disclosure, after the multimedia resource is generated, the content of the multimedia resource may be manually labelled. That is, the resource title or the resource description may be added to the multimedia resource based on the content of the multimedia resource.

At block 4140, the resource attribute is analyzed to obtain a resource tag corresponding to the resource attribute.

Analyzing the resource attribute may be implemented as performing a natural semantic understanding on the resource attribute and determining a result of the natural semantic understanding as the resource tag corresponding to the resource attribute.

For example, the resource title of a video related to sports is "Little Football Player" and the resource description is "An inspirational story of a child with athletic talent from a slum area to become a football superstar". Through the semantic understanding on the resource title and resource description, the resource tag obtained may include "football", "inspirational", and "sports".

At block 4150, based on the resource tag, the resource category is determined from a preset set of candidate resource categories. A semantic similarity between the resource category and the resource tag is greater than a similarity threshold.

In some embodiments of the disclosure, the set of candidate resource categories can be generated in advance. After the resource tag corresponding to the resource attribute is obtained, the semantic similarities between the resource tag corresponding to the resource attribute and the set of candidate resource categories may be obtained. The candidate resource category having the sematic similarity with respect to the resource tag greater than the similarity threshold is determined as the resource category of the multimedia resource.

For example, in combination with examples of the block 4140, in a case that the set of candidate resource categories includes "eating", "travel", and "sports", the semantic similarities between the resource tags "football", "inspirational", and "sports" and each candidate resource category included in the set of candidate resource categories are determined. It may be determined that the semantic similarity between the candidate resource category "sports" and the resource tag "sports" is the largest, such that the "sports" may be determined as the resource category of the multimedia resource.

By performing rapid semantic understanding analysis and obtaining semantic similarity of the resource attribute of the multimedia resource, the resource category of the multimedia resource can be quickly determined directly through the analysis result, thereby improving the processing efficiency.

In implementations of embodiments of the disclosure, the block 410 may include the following.

At block 4160, a text of the multimedia resource is obtained. The text at least includes a content text of the multimedia resource or a title of the multimedia resource. For example, the text includes only the content text, only the title, or both the content text and the title.

Details of this block may refer to the aforementioned block 4130, which is not repeated here.

At block 4170, a segment is extracted from the text, and the segment is determined as a descriptive tag.

The text may be segmented to obtain multiple segments. The segment may be used as the descriptive tag. For example, for a sport-related video having the resource title of "Little Football Player" and the resource description of "An inspirational story of a child with athletic talent from a slum area to become a football superstar", by segmenting the resource title and resource description, the segments can be obtained including: "football", "inspirational", and "sports".

At block 4180, the semantic similarity between the descriptive tag and preset classification categories is obtained.

At block 4190, a classification category is determined as the resource category of the multimedia resource, in response to determining that the semantic similarity between the classification category and the descriptive tag is greater than or equal to a preset similarity threshold.

In some embodiments of the disclosure, the classification categories can be generated in advance, such that the similarities between the resource tag corresponding to the resource attribute and the classification categories are obtained after the resource tag corresponding to the resource attribute is obtained. In response to determining that the semantic similarity between the classification category and the resource tag is greater than the similarity threshold, the classification category is determined as the resource category of the multimedia resource.

By performing rapid word segmentation processing and obtaining semantic similarity of the text of the multimedia resource, the resource category of the multimedia resource can be quickly determined through the analysis result, thereby improving the processing efficiency.

At block 420, an emoticons is selected based on the resource category of the multimedia resource.

In some embodiments of the disclosure, a correspondence between an emoticons collection and resource categories can be established in advance. Based on the correspondence, the emoticons may be selected for the multimedia resource.

For example, a video and an emoticons may be classified by a video website. The video associated with travel and entertainment may be categorized into the "travel" video, and the emoticons associated with scenery and traveling may be categorized into the "travel" emoticons. In response to the comment trigger operation from the user account on the "travel" video, the "travel" emoticons may be determined as the emoticons corresponding to the "travel" video.

In implementations the embodiments of the disclosure, the block 420 may include the following.

At block 4210, an emoticons category corresponding to the resource category of the multimedia resource is determined from a preset correspondence list. The correspondence list includes a correspondence between resource categories and the emoticons categories.

In some embodiments of the disclosure, the correspondence list between the resource categories and the emoticons categories may be pre-established. Based on the correspondence list, the emoticons category corresponding to the resource category of the multimedia resource may be determined.

For example, the video and the emoticons may be classified by a video website in advance. The video associated with travel and entertainment may be categorized into the "travel" video, and the emoticons associated with scenery and traveling may be categorized into the "travel" emoticons. The correspondence between the "travel" video and the "travel" emoticons may be established and stored in the correspondence list. Based on that the multimedia resource is the "travel" video, the "travel" emoticons may be determined as the emoticons.

At block 4220, the emoticons corresponding to the emoticons category is selected from an emoticons collection. In the emoticons collection, each emoticons has a corresponding emoticons category.

The emoticons corresponding to the emoticons category can be selected from the emoticons collection based on the emoticons category. For example, in connection with examples of the block 4220, the emoticons collection can have the category of "travel" and emoticons corresponding to the category of "travel" stored therein. Based on the emoticons category "travel", the emoticons corresponding to the emoticons category may be obtained.

By pre-establishing the correspondence between the resource categories and the emoticons categories, it is possible to quickly determine and obtain the emoticons without supervision through the classification algorithm in practice, thereby improving the processing efficiency.

In implementations of embodiments of the disclosure, the block 4220 may include the following.

At block 42210, from the emoticons collection, a candidate emoticons collection is determined based on the emoticons category.

At block 42220, based on a first historical record of using the candidate emoticons collection, the emoticons is selected from the candidate emoticons collection. The number of times for the emoticons used by the user account is greater than or equal to a first preset threshold.

The first historical record includes the number of times for each candidate emoticons used by the user account.

In some embodiments of the disclosure, the first historical record including the number of times for each candidate emoticons used by the user account can be obtained from a storage database of the terminal or a storage database of the service server. The number of times for each candidate emoticons used by the user account can be counted based on the first historical record. The emoticons may be determined in response to determining that the number of times for the emoticons used by the user account is greater than or equal to a first preset threshold. The candidate emoticons may be used as a commonly used emoticons in response to that the number of times for the candidate emoticons used by the user account is greater than the first preset threshold. Therefore, the emoticons may be provided to the user in conformity to the user's usage habit, based on the historical usage habit of the user, thereby improving the user experience.

In implementations of embodiments of the disclosure, the block 4220 may include the following.

At block 42230, a user profile of the user account and other user profiles of other user accounts are obtained.

The user portrait at least includes age, gender, region, occupation or interests of the user account. Other user portraits at least include age, gender, region, occupation or interests other user accounts.

The user portraits of all user accounts may be required from the service server. The user portrait may be also referred to as user role, which outlines users and connects the user's requirements to the design direction. The user portrait is widely used in various fields.

In practice, attributes, behaviors and expectations of a user account can be linked. For example, the age, the gender, the region, the occupation and the interests provided by the user during registering the user account and the browsing history generated by an application are linked. By collecting the information, the user profile may be generated for the user account. For example, the application is a video application and the user watches action movies frequently. Therefore, an "action" tag may be added to the user portrait corresponding to the user account. When recommending personalized content for the user, based on the "action" tag of the user portrait, videos having the "action" tag can be recommended for the user, thereby improving accuracy of recommendation.

In a case that the user portraits are stored locally, the user portraits can be directly obtained.

At block 42240, a similar user account of the user account is determined based on that a similarity between the user portrait of the user account and the user portrait of the similar user account is greater than or equal to a preset similarity threshold.

In detail, the content of the user portrait may be in a format of text. Therefore, text similarities between the user portrait and other user portraits may be obtained. When the text similarity between the user portrait and another user portrait is greater than or equal to the preset similarity threshold, the user account corresponding to another user portrait may be determined as the similar user account of the first user account.

The similar user account of the user account refers to an associated user account to the user account. In the recommendation, usage habits of the similar user account are associated with the user account, which can increase the recommendation range and recommendation richness.

At block 42250, based on a second historical record of using the candidate emoticons collection, the emoticons is selected from the candidate emoticons collection based on that the number of times for the emotions used by the similar user account is greater than or equal to a second preset threshold.

The second historical record includes the number of times for each candidate emoticons used by the similar user account.

The second historical record including the number of times for each candidate emotions used by the similar user account can be obtained from the storage database of the terminal or the storage database of the service server. The number of times for each candidate emoticons used by the similar user account can be counted based on the second historical record The emoticons is obtained from the candidate emoticons collection in response to determining that the number of times for the emoticons used by the similar user account is greater than or equal to the second preset threshold. The candidate emoticons may be used as a commonly used emoticons in response to determining that the number of times for the candidate emotions used by the similar user account is greater than or equal to the second preset threshold. Therefore, an emoticons collections may be provided to the similar user account in conformity to the usage habit of the similar user account, based on the historical usage habit of the similar user account, thereby improving the user experience.

In implementations of embodiments of the disclosure, the 420 may further include the following.

At block 4230, based on a third historical record of using the emoticons collection, a top resource category corresponding to each emoticons in the emoticons collection is determined.

The top resource category corresponding to the emoticons is a resource category of a kind of multimedia resources. The kind of multimedia resource is commented most frequently using the emoticons. That is, the emoticons is most frequently used to comment on the kind of multimedia resources. The third historical record includes the number of times for each emoticons used for comments.

Based on the third historical record, the number of times for each emoticons used for comments can be counted. For example, in the third historical record, a first kind of multimedia resources 1 are commented using the emoticons A for 100 times, a second kind of multimedia resources 2 are commented using the emoticons B for 1000 times, and a third kind of multimedia resources 3 are commented using the emoticons C for 700 times. The resource category of the first kind of multimedia resources 1 may be determined as the top resource category X corresponding to the emoticons A.

At block 4240, in a case that the resource category of the emoticons determined from the correspondence list is different from the top resource category, the resource category in the correspondence list is replaced with the top resource category.

In connection with examples of the block 4230, in the correspondence list, the resource category corresponding to the emoticons category of the emoticons A is Y. In this case, the correspondence does not conform to an actual application. The resource category corresponding to emoticons A in the correspondence may be modified to the top resource category Y. In addition, in a case that the correspondence list does not include a correspondence between the emoticons A and the resource category, the correspondence between the emoticons A and the top resource category X may be newly established.

With real-time statistics of the number of times for each emoticons used for comments based on the historical record, the correspondence list may be updated in real time to improve the timeliness of correspondences and improve the accuracy of the correspondence list.

In implementations of embodiments of the disclosure, the 420 may further include the following.

At block 4250, an emoticons tag of each emoticons in the emoticons collection is obtained to obtain an emoticons tag set.

In some embodiments of the disclosure, after each emoticons in the emoticons collection is generated, the emoticons may be manually labelled. That is, an emoticons tag may be added to the emoticons based on the content of the emoticons. The emoticons tag may include a style tag of the emoticons and a title tag of the emoticons.

Therefore, by extracting the emoticons tag of each emoticons in the emoticons collection, the emoticons tag set can be obtained.

At block 4260, the emoticons tag set is semantically clustered, to determine emoticons categories and the correspondence between emoticons tags and emoticons categories. The emoticons category of each emoticons in the emoticons collection may be obtained.

By semantically clustering the emoticons tag set, the correspondence between the emoticons tags and the emoticons categories can be determined.

In detail, semantically clustering may include clustering the emoticons based on the emoticons tags. The method of clustering may be a semantic clustering algorithm. That is, the emoticons tags having similar semantics are clustered as a cluster, to obtain the emoticons category corresponding to each emoticons. A cluster is an emoticons category and includes an emoticons collection corresponding to the emoticons category.

For example, the semantic clustering algorithm can classify an emoticons collection corresponding to eating, drinking and food into food category, and classify an emoticons collection corresponding to scenery, airplanes and yachts into travel category.

Since the semantically clustering may be implemented by the semantic clustering algorithm without supervision, based on the training data, the unsupervised training of the semantic clustering algorithm model may be realized. That is, the correspondence between the emoticons categories and the emoticons tags may be obtained through the semantic clustering algorithm.

At block 430, the emoticons is displayed for the user account to select an emoticon from the emoticons for commenting on the multimedia resource.

Details of this block are similar to the implementation process of the foregoing block 120, which is not described in detail in embodiments of the disclosure.

With the method for commenting on a multimedia resource according to embodiments of the disclosure, based on the trigger of commenting on the multimedia resource from the user account, the emoticons corresponding to the multimedia resource is obtained. The emoticons is displayed to the user account to enable the user account to comment on the multimedia resource based on the emoticons. In the disclosure, in response to a trigger operation for commenting on the multimedia resource performed by the user account, based on the emoticons corresponding to the multimedia resource, the user account may comment on the multimedia resource without trivial operations, such as searching or querying, such that the emoticons suitable for commenting on the multimedia resources can be quickly provided to enhance user's experience of commenting.

Figure 5:
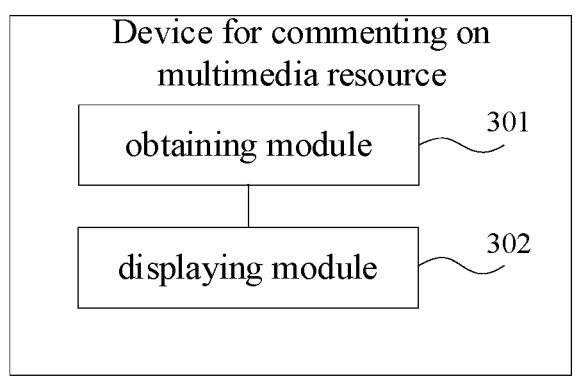
FIG. 5 is a block diagram illustrating a device for commenting on a multimedia resource according to embodiments of the disclosure.

FIG. 5 is a block diagram illustrating a device for commenting on a multimedia resource according to embodiments of the disclosure. As illustrated in FIG. 5, the device includes an obtaining module 301 and a displaying module 302.

The obtaining module 301 is configured to obtain an emoticons corresponding to a multimedia resource based on a comment trigger operation on the multimedia resource from a user account.

The displaying module 302 is configured to display the emoticons to the user account to enable the user account to comment on the multimedia resource based on the emoticons.

In some examples, the obtaining module 31 includes an obtaining submodule and a selecting submodule.

The obtaining submodule is configured to obtain a resource category of the multimedia resource.

The selecting submodule is configured to obtain the emoticons based on the resource category of the multimedia resource.

In some examples, the obtaining submodule includes a second extracting unit, an analyzing unit and a second selecting unit.

The second extracting unit is configured to obtain a resource attribute of the multimedia resource. The resource attribute at least includes a resource title or a resource description of the multimedia resource.

The analyzing unit is configured to analyze the resource attribute to obtain a resource tag corresponding to the resource attribute.

The second selecting unit is configured to obtain the resource category from a preset set of candidate resource categories based on the resource tag. A semantic similarity between the resource category and the resource tag is greater than a similarity threshold.

In some examples, the obtaining submodule includes a third extracting unit, a fourth extracting unit, a similarity obtaining unit and a fifth determining unit.

The third extracting unit is configured to obtain a text of the multimedia resource. The text at least includes a content text of the multimedia resource or a title of the multimedia resource.

The fourth extracting unit is configured to obtain a segment from the text and determined the segment as a descriptive tag.

The similarity obtaining unit is configured to obtain the semantic similarity between the descriptive tag and a preset classification category.

The fifth determining unit is configured to determine the classification category as the resource category of the multimedia resource based on that the semantic similarity between the classification category and the descriptive tag is greater than or equal to a preset similarity threshold.

In some examples, the obtaining submodule includes a third determining unit and a fourth determining unit.

The third determining unit is configured to recognize image frames included in the multimedia resource to determine objects of the multimedia resource and relationships of the objects.

The fourth determining unit is configured to determine the resource category of the multimedia resource based on object attributes of the objects, the relationships of the objects, and a resource attribute of the multimedia resource.

The object attribute at least includes an object type or an object name. The resource attribute at least includes a resource title or a resource description of the multimedia resource.

In some examples, the selecting submodule includes a first determining unit and a first selecting unit.

The first determining unit is configured to determine an emoticons category corresponding to the resource category of the multimedia resource from a preset correspondence list. The correspondence list includes a correspondence between resource categories and the emoticons categories.

The first selecting unit is configured to obtain the emoticons corresponding to the emoticons category from an emoticons collection. In the emoticons collection, each emoticons has a corresponding emoticons category.

In some examples, the first selecting unit includes a first selecting subunit and a second selecting subunit.

The first selecting subunit is configured to determine from the emoticons collection, a candidate emoticons collection is obtained from the emoticons collection based on the emoticons category.

The second selecting subunit is configured to obtain the emoticons from the candidate emoticons collection based on a first historical record of using the candidate emoticons collection. The number of times for the emoticons used by the user account is greater than or equal to a first preset threshold. The first historical record includes the number of times for each candidate emoticons used by the user account.

In some examples, the first selecting subunit includes an obtaining subunit, a determining subunit and a third selecting subunit.

The obtaining subunit is configured to obtain a user profile of the user account and other user profiles of other user accounts. The user portrait at least includes age, gender, region, occupation or interests of the user account. Other user portraits at least include age, gender, region, occupation or interests other user accounts.

The determining subunit is configured to determine a similar user account of the user account from other user accounts in response to determining that a similarity between the user portrait of the user account and the user portrait of the similar user account is greater than or equal to a preset similarity threshold.

The third selecting subunit is configured to obtain the emoticons from the candidate emoticons collection based on a second historical record of using the candidate emoticons collection, in response to determining that the number of times for the emoticons used by the similar user account is greater than or equal to a second preset threshold. The second historical record includes the number of times for each candidate emoticons used by the similar user similar.

In some examples, the selecting submodule includes a second determining unit and replacing unit.

The second determining unit is configured to determine a top resource category corresponding to each emoticons based on a third historical record of using emoticons collection. The top resource category corresponds to a kind of multimedia resources and the emoticons is most frequently used to comment on the kind of multimedia resources. The third historical record includes the number of times for each emoticons used for comments.

The replacing unit is configured to in a case that the resource category of the emoticons in the correspondence list is different from the top resource category, the resource category is replaced with the top resource category.

In some example, the selecting submodule further includes a first extracting unit and a clustering unit.

The first extracting unit is configured to obtain an emoticons tag of each emoticons in the emoticons collection to obtain an emoticons tag set.

The clustering unit is configured to semantically cluster the emoticons tag set to determine emoticons categories and a correspondence between emoticons tags and emoticons categories. The emoticons category of each emoticons in the emoticons collection is obtained.

With the device for commenting on a multimedia resource according to embodiments of the disclosure, based on the comment trigger operation on the multimedia resource from the user account, the emoticons corresponding to the multimedia resource is obtained by the obtaining module. The emoticons is displayed by the displaying module to the user account, to enable the user account to comment on the multimedia resource based on the emoticons. In the disclosure, in response to the comment trigger operation on the multimedia resource performed by the user account, based on the emoticons corresponding to the multimedia resource, the user account may comment on the multimedia resource without trivial operations, such as searching or querying, such that the emoticons suitable for commenting on the multimedia resources can be quickly provided to enhance user's experience of commenting.

Figure 6:
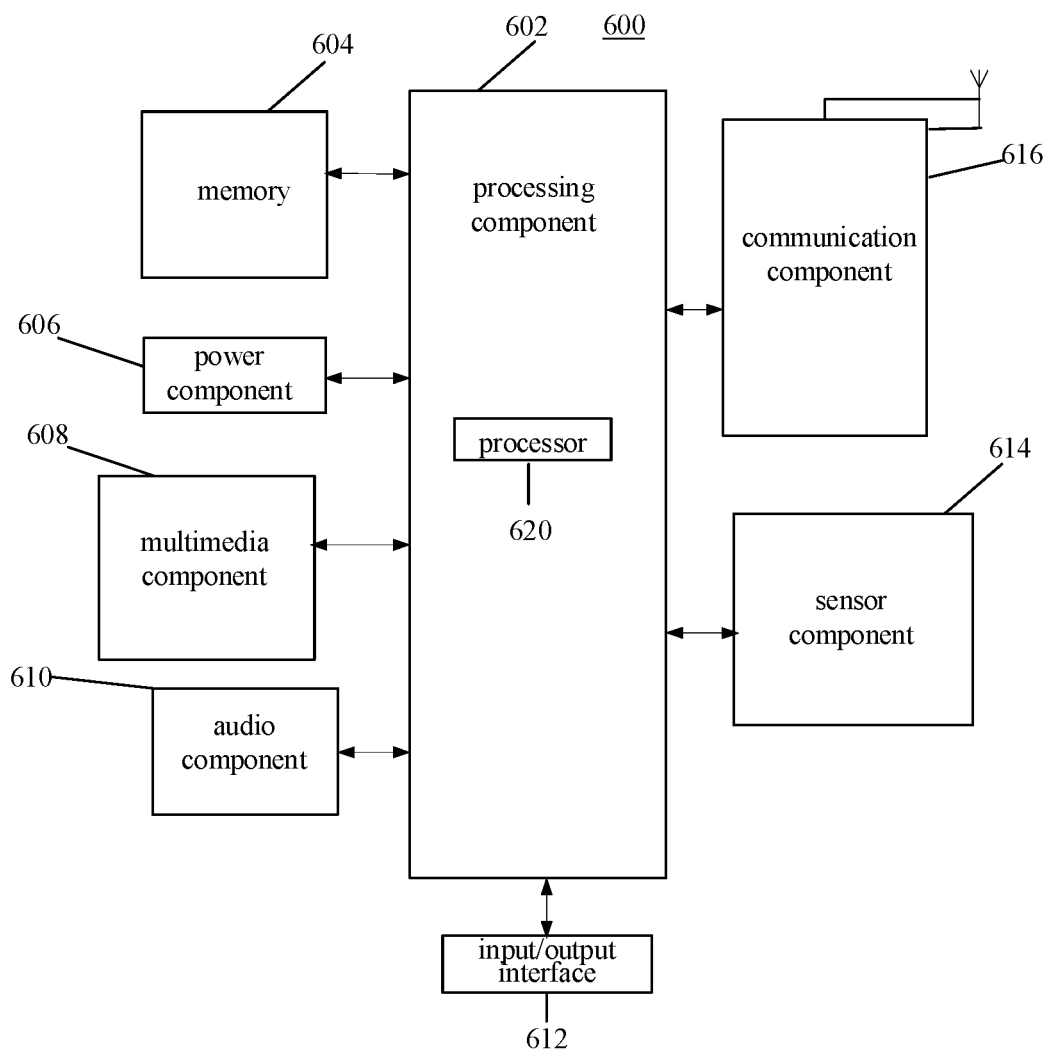
FIG. 6 is a logical diagram illustrating an electronic device according to embodiments of the disclosure.

FIG. 6 is a block diagram illustrating an electronic device 600 according to embodiments of the disclosure. The electronic device 600 may be a mobile phone, a computer, a digital broadcast terminal, a messaging device, a game console, a tablet device, medical equipment, fitness equipment, a personal digital assistant, and so on.

As illustrated in FIG. 6, the electronic device 600 may include one or more of the following components: a processing component 602, a memory 604, a power component 606, a multimedia component 608, an audio component 640, an input/output (I/O) interface 612, a sensor component 614, and a communication component 616.

The processing component 602 normally controls the overall operation (such as operations associated with displaying, telephone calls, data communications, camera operations and recording operations) of the electronic device 600. The processing component 602 may include one or more processors 620 to execute instructions so as to perform all or part of the blocks of the above-described method. In addition, the processing component 602 may include one or more units to facilitate interactions between the processing component 602 and other components. For example, the processing component 602 may include a multimedia unit to facilitate interactions between the multimedia component 608 and the processing component 602.

The memory 604 is configured to store various types of data to support operations at the electronic device 600. Examples of such data include instructions of any application or method operated on the electronic device 600, contact data, phone book data, messages, images, videos and the like. The memory 604 may be realized by any type of volatile or non-volatile storage devices, or a combination thereof, such as a static random-access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 606 provides power to various components of the electronic device 600. The power component 606 may include a power management system, one or more power sources and other components associated with power generation, management, and distribution of the electronic device 600.

The multimedia component 608 includes a screen that provides an output interface between the electronic device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slides, and gestures on the touch panel. The touch sensor may sense not only boundaries of the touch or sliding operation, but also the duration and pressure related to the touch or sliding operation. In some embodiments, the multimedia component 608 includes a front camera and/or a rear camera. When the electronic device 600 is in an operation mode such as a shooting mode or a video mode, the front camera and/or the rear camera may receive external multimedia data. Each of the front camera and the rear camera may be a fixed optical lens system or have a focal length and an optical zoom capability.

The audio component 610 is configured to output and/or input an audio signal. For example, the audio component 610 includes a microphone (MIC) that is configured to receive an external audio signal when the electronic device 600 is in an operation mode such as a call mode, a recording mode, and a voice recognition mode. The received audio signal may be further stored in the memory 604 or transmitted via the communication component 616. In some embodiments, the audio component 610 further includes a speaker for outputting the audio signal.

The I/O interface 612 provides an interface between the processing component 602 and a peripheral interface unit. The peripheral interface unit may be a keyboard, a click wheel, a button and so on. These buttons may include, but are not limited to, a home button, a volume button, a start button, and a locking button.

The sensor assembly 614 includes one or more sensors for providing the electronic device 600 with various aspects of status assessments. For example, the sensor component 614 may detect an ON/OFF state of the electronic device 600 and a relative positioning of the components. For example, the components may be a display and a keypad of the electronic device 600. The sensor component 614 may also detect a change in position of the electronic device 600 or a component of the electronic device 600, the presence or absence of contact of the user with the electronic device 600, the orientation or acceleration/deceleration of the electronic device 600 and a temperature change of the electronic device 600. The sensor component 614 may include a proximity sensor configured to detect the presence of nearby objects without any physical contact. The sensor component 614 may also include an optical sensor (such as a CMOS or a CCD image sensor) for use in imaging applications. In some embodiments, the sensor component 614 may further include an acceleration sensor, a gyro sensor, a magnetic sensor, a pressure sensor, or a temperature sensor.

The communication component 616 is configured to facilitate wired or wireless communication between the electronic device 600 and other devices. The electronic device 600 may access a wireless network based on a communication standard such as Wi-Fi, an operator network (such as 2G, 3G, 4G or 5G), or a combination thereof. In an example embodiment, the communication component 616 receives broadcast signals or broadcast-associated information from an external broadcast management system via a broadcast channel. In an example embodiment, the communication component 616 further includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology and other technologies.

In some embodiments, the electronic device 600 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above method.

In some embodiments, the processor 620 is configured to receive a comment trigger operation on a multimedia resource from a user account; obtain an emoticons corresponding to the multimedia resource based on the comment trigger operation; and display the emoticons to enable the user account to comment on the multimedia resource with the emoticons.

In some embodiments, the processor 620 is further configured to obtain a resource category of the multimedia resource; and obtain the emoticons based on the resource category.

In some embodiments, the processor 620 is further configured to determine an emoticons category corresponding to the resource category of the multimedia resource based on a correspondence list, in which the correspondence list includes a correspondence between resource categories and emoticons categories; and obtain the emoticons corresponding to the emoticons category from an emoticons collection, in which each emoticons in the emoticons collection corresponds to an emoticons category.

In some embodiments, the processor 620 is further configured to obtain a candidate emoticons collection corresponding to the emoticons category from the emoticons collection; and obtain the emoticons from the candidate emoticons collection, in which a number of times for the emoticons used by the user account is greater than or equal to a first threshold.

In some embodiments, the processor 620 is further configured to obtain user portraits of the user account and other user accounts, in which the user portrait includes age, gender, region, occupation or interests of a user account; obtain a similar user account from other user accounts, in which a similarity between the user portrait of the user account and the user portrait of the similar user account is greater than or equal to a first similarity threshold; and obtain the emoticons from the candidate emoticons collection, in which a number of times for the emoticons used by the similar user account is greater than or equal to a second threshold.

In some embodiments, the processor 620 is further configured to determine a top resource category corresponding to an emoticons in the emotions collection, in which the top resource category corresponds to a kind of multimedia resources, and the emoticons is most frequently used to comment on the kind of multimedia resources; and replace the resource category corresponding to the emoticons in the correspondence list with the top resource category based on the resource category being different from the top resource category.

In some embodiments, the processor 620 is further configured to obtain an emoticons tag set of the emoticons collection; and obtain emoticons categories and a correspondence between emoticons tags and the emoticons categories by semantically clustering the emoticons tag set, in which each emoticons in the emoticons collection corresponds to an emoticons category.

In some embodiments, the processor 620 is further configured to obtain objects and relationships of the objects by recognizing image frames of the multimedia resource; and determine the resource category based on object attributes of the objects, the relationships and a resource attribute of the multimedia resource, in which the object attribute includes an object type and an object name, and the resource attribute includes a resource title and a resource description of the multimedia resource.

In some embodiments, the processor 620 is further configured to obtain a resource attribute of the multimedia resource, in which the resource attribute includes a resource title and a resource description of the multimedia resource; obtain a resource tag by analyzing the resource attribute; and obtain the resource category from a set of candidate resource categories based on the resource tag, in which a sematic similarity between the resource category and the resource tag is greater than a second similarity threshold.

In some embodiments, the processor 620 is further configured to obtain a text of the multimedia resource, in which the text includes a content text and a title; determine a descriptive tag of the text by segmenting the text; obtain a sematic similarity between the descriptive tag and a classification category; and determine the classification category as the resource category in response to determining that the semantic similarity is greater than or equal to a third similarity threshold.

In some embodiments, there is also provided a storage medium including instructions, such as a memory 604 including instructions. The instructions are executable by the processor 620 of the electronic device 600 to perform the above method. For example, the storage medium is non-transitory computer readable storage medium. In an example, the non-transitory computer readable storage medium may be a ROM, a random-access memory (RAM), a CD-ROM, a magnetic tape, a floppy disk, an optical data storage device, and so on.

In some embodiments, the method includes receiving a comment trigger operation on a multimedia resource from a user account; obtaining an emoticons corresponding to the multimedia resource based on the comment trigger operation; and displaying the emoticons to enable the user account to comment on the multimedia resource with the emoticons.

In some embodiment, obtaining the emoticons includes obtaining a resource category of the multimedia resource; and obtaining the emoticons based on the resource category.

In some embodiments, obtaining the emoticons based on the resource category includes determining an emoticons category corresponding to the resource category of the multimedia resource based on a correspondence list, in which the correspondence list includes a correspondence between resource categories and emoticons categories; and obtaining the emoticons corresponding to the emoticons category from an emoticons collection, in which each emoticons in the emoticons collection corresponds to an emoticons category.

In some embodiments, obtaining the emoticons includes obtaining a candidate emoticons collection corresponding to the emoticons category from the emoticons collection; and obtaining the emoticons from the candidate emoticons collection, in which a number of times for the emoticons used by the user account is greater than or equal to a first threshold.

In some embodiments, the method further includes obtaining user portraits of the user account and other user accounts, in which the user portrait includes age, gender, region, occupation or interests of a user account; obtaining a similar user account from other user accounts, in which a similarity between the user portrait of the user account and the user portrait of the similar user account is greater than or equal to a first similarity threshold; and obtaining the emoticons from the candidate emoticons collection, in which a number of times for the emoticons used by the similar user account is greater than or equal to a second threshold.

In some embodiments, the method further includes determining a top resource category corresponding to an emoticons in the emotions collection, in which the top resource category corresponds to a kind of multimedia resources, and the emoticons is most frequently used to comment on the kind of multimedia resources; and replacing the resource category corresponding to the emoticons in the correspondence list with the top resource category based on the resource category being different from the top resource category.

In some embodiments, the method further includes obtaining an emoticons tag set of the emoticons collection; and obtaining emoticons categories and a correspondence between emoticons tags and the emoticons categories by semantically clustering the emoticons tag set, in which each emoticons in the emoticons collection corresponds to an emoticons category.

In some embodiments, obtaining the resource category includes obtaining objects and relationships of the objects by recognizing image frames of the multimedia resource; and determining the resource category based on object attributes of the objects, the relationships and a resource attribute of the multimedia resource, in which the object attribute includes an object type and an object name, and the resource attribute includes a resource title and a resource description of the multimedia resource.

In some embodiments, obtaining the resource category includes obtaining a resource attribute of the multimedia resource, in which the resource attribute includes a resource title and a resource description of the multimedia resource; obtaining a resource tag by analyzing the resource attribute; and obtaining the resource category from a set of candidate resource categories based on the resource tag, in which a sematic similarity between the resource category and the resource tag is greater than a second similarity threshold.

In some embodiments, obtaining the resource category includes obtaining a text of the multimedia resource, in which the text includes a content text and a title; determining a descriptive tag of the text by segmenting the text; obtaining a sematic similarity between the descriptive tag and a classification category; and determining the classification category as the resource category in response to determining that the semantic similarity is greater than or equal to a third similarity threshold.

Figure 7:
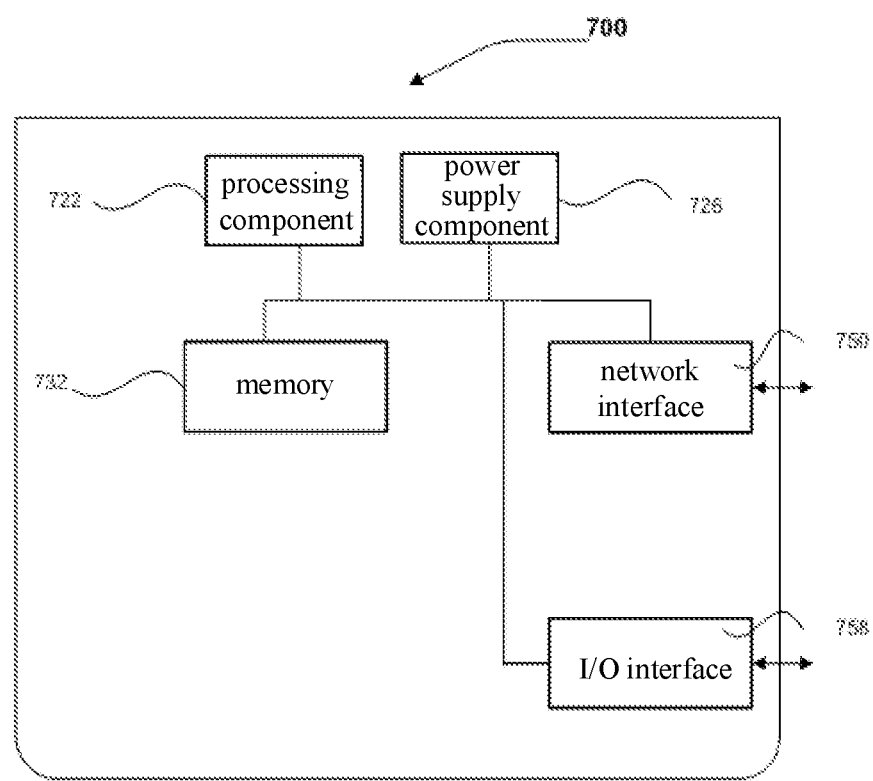
FIG. 7 is a logical diagram illustrating an electronic device according to further embodiments of the disclosure.

FIG. 7 is a block diagram of an electronic device 700 according to embodiments of the disclosure. For example, the electronic device 700 may be implemented as a server. As illustrated in FIG. 7, the electronic device 700 includes a processing component 722 and a memory resource represented by a memory 732 for storing instructions, such as applications, that can be executed by processing component 722. The processing component 722 further includes one or more processors. The application program stored in the memory 732 may include one or more modules, each corresponding to a set of instructions. In addition, the processing component 722 is configured to execute instructions to execute the above-described method for commenting on a multimedia resource.

The electronic device 700 may further include a power supply component 726 configured to perform power management of the electronic device 700, a wired or wireless network interface 750 configured to connect the electronic device 700 to the network, and an input-output (I/O) interface 758. The electronic device 700 may operate an operating system based on memory 732, such as windows Server™, Mac OS X™, Unix™, Linux™, FreeBSD™.

Embodiments of the disclosure further provides an application program. When the application program is executed by a processor of the electronic device, the method for commenting on a multimedia resource is executed.

Other embodiments of the present disclosure will be apparent to those skilled in the art after considering the description and practicing the present disclosure disclosed herein. The present disclosure is intended to cover any variations, uses or adaptive changes of the present disclosure. These variations, uses or adaptive changes are in accordance with general principles of the present disclosure and include common knowledge or technical means in the art that are not disclosed herein. The description and embodiments are to be regarded as illustrative only, and the real scope and spirit of the present disclosure are pointed out in the attached claims.

It should be understood that the present disclosure is not limited to the precise structures described above and illustrated in the drawings, and various modifications and changes may be made without departing from the scope thereof. The scope of the present disclosure is merely limited by the attached claims.

What is claimed is:

1. A method for commenting on a multimedia resource, comprising:
   receiving a comment trigger operation on a multimedia resource from a user account;
   obtaining an emoticons corresponding to the multimedia resource based on the comment trigger operation; and
   displaying the emoticons to enable the user account to comment on the multimedia resource with the emoticons;
   wherein said obtaining the emoticons comprises:
   obtaining relationships of objects by recognizing image frames of the multimedia resource;
   obtaining a resource category at least based on the relationships; and
   obtaining the emoticons based on the resource category; and
   determining object attributes of the objects and a resource attribute of the multimedia resource; and
   wherein said obtaining the resource category at least based on the relationships comprises: determining the resource category based on the object attributes of the objects, the relationships and the resource attribute of the multimedia resource, wherein the object attribute comprises an object type and an object name, and the resource attribute comprises a resource title and a resource description of the multimedia resource.

2. The method of claim 1, wherein said obtaining the emoticons based on the resource category comprises:
   determining an emoticons category corresponding to the resource category of the multimedia resource based on a correspondence list, wherein the correspondence list comprises a correspondence between resource categories and emoticons categories; and
   obtaining the emoticons corresponding to the emoticons category from an emoticons collection, wherein each emoticons in the emoticons collection corresponds to an emoticons category.

3. The method of claim 2, wherein said obtaining the emoticons comprises:
   obtaining a candidate emoticons collection corresponding to the emoticons category from the emoticons collection; and
   obtaining the emoticons from the candidate emoticons collection, wherein a number of times for the emoticons used by the user account is greater than or equal to a first threshold.

4. The method of claim 3, further comprising:
   obtaining user portraits of the user account and other user accounts, the user portrait comprising age, gender, region, occupation or interests of a user account;
   obtaining a similar user account from other user accounts, wherein a similarity between the user portrait of the user account and the user portrait of the similar user account is greater than or equal to a first similarity threshold; and
   obtaining the emoticons from the candidate emoticons collection, wherein a number of times for the emoticons used by the similar user account is greater than or equal to a second threshold.

5. The method of claim 2, further comprising:
   determining a top resource category corresponding to an emoticons in the emotions collection, wherein the top resource category corresponds to a kind of multimedia resources, and the emoticons is most frequently used to comment on the kind of multimedia resources; and
   replacing the resource category corresponding to the emoticons in the correspondence list with the top resource category based on the resource category being different from the top resource category.

6. The method of claim 2, further comprising:
   obtaining an emoticons tag set of the emoticons collection; and
   obtaining emoticons categories and a correspondence between emoticons tags and the emoticons categories by semantically clustering the emoticons tag set, wherein each emoticons in the emoticons collection corresponds to an emoticons category.

7. An electronic device, comprising:
   a processor; and
   a memory, configured to store computer instructions executable by the processor,
   wherein, in response to determining that the computer instructions are executed by the processor, the processor is configured to:
   receive a comment trigger operation on a multimedia resource from a user account;
   obtain an emoticons corresponding to the multimedia resource based on the comment trigger operation; and
   display the emoticons to enable the user account to comment on the multimedia resource with the emoticons;
   wherein the processor is further configured to:
   obtain relationships of objects by recognizing image frames of the multimedia resource;
   obtain a resource category at least based on the relationships; and
   obtain the emoticons based on the resource category; and
   determine object attributes of the objects and a resource attribute of the multimedia resource; and determine the resource category based on the object attributes of the objects, the relationships and the resource attribute of the multimedia resource, wherein the object attribute comprises an object type and an object name, and the resource attribute comprises a resource title and a resource description of the multimedia resource.

8. The electronic device of claim 7, wherein the processor is further configured to:
determine an emoticons category corresponding to the resource category of the multimedia resource based on a correspondence list, wherein the correspondence list comprises a correspondence between resource categories and emoticons categories; and
obtain the emoticons corresponding to the emoticons category from an emoticons collection, wherein each emoticons in the emoticons collection corresponds to an emoticons category.

9. A non-transitory computer-readable storage medium, having computer instructions stored thereon, wherein in response to determining that the computer instructions are executed by a processor, a method for commenting on a multimedia resource is executed, the method comprising:
receiving a comment trigger operation on a multimedia resource from a user account;
obtaining an emoticons corresponding to the multimedia resource based on the comment trigger operation; and
displaying the emoticons to enable the user account to comment on the multimedia resource with the emoticons;

wherein said obtaining the emoticons comprises:
obtaining relationships of objects by recognizing image frames of the multimedia resource;
obtaining a resource category at least based on the relationships; and
obtaining the emoticons based on the resource category; and
determining object attributes of the objects and a resource attribute of the multimedia resource; and
wherein said obtaining the resource category at least based on the relationships comprises: determining the resource category based on the object attributes of the objects, the relationships and the resource attribute of the multimedia resource, wherein the object attribute comprises an object type and an object name, and the resource attribute comprises a resource title and a resource description of the multimedia resource.

10. The non-transitory computer-readable storage medium of claim 9, wherein said obtaining the emoticons based on the resource category comprises:
determining an emoticons category corresponding to the resource category of the multimedia resource based on a correspondence list, wherein the correspondence list comprises a correspondence between resource categories and emoticons categories; and
obtaining the emoticons corresponding to the emoticons category from an emoticons collection, wherein each emoticons in the emoticons collection corresponds to an emoticons category.

* * * * *